(12) United States Patent
Giribet Guadamillas

(10) Patent No.: US 8,610,402 B2
(45) Date of Patent: Dec. 17, 2013

(54) ADAPTOR DEVICE FOR CHARGING PORTABLE ELECTRONIC APPARATUS

(75) Inventor: Jacques Giribet Guadamillas, Barcelona (ES)

(73) Assignee: Inoitulos, S.l., Barcelona (ES)

( * ) Notice: Subject to any disclaimer, the term of this patent is extended or adjusted under 35 U.S.C. 154(b) by 807 days.

(21) Appl. No.: 12/447,121

(22) PCT Filed: Oct. 26, 2007

(86) PCT No.: PCT/EP2007/009310
§ 371 (c)(1),
(2), (4) Date: Apr. 24, 2009

(87) PCT Pub. No.: WO2008/055597
PCT Pub. Date: May 15, 2008

(65) Prior Publication Data
US 2010/0001688 A1 Jan. 7, 2010

(30) Foreign Application Priority Data
Nov. 6, 2006 (ES) .................................. 200602863

(51) Int. Cl.
*H02J 7/00* (2006.01)
*G06F 1/16* (2006.01)

(52) U.S. Cl.
USPC ................. 320/114; 320/115; 361/679.01

(58) Field of Classification Search
USPC ....................................................... 320/114
See application file for complete search history.

(56) References Cited

U.S. PATENT DOCUMENTS

| | | | | |
|---|---|---|---|---|
| 5,233,281 | A | * | 8/1993 | Chiang et al. ................. 320/110 |
| 5,280,229 | A | | 1/1994 | Faude et al. |
| 5,742,149 | A | * | 4/1998 | Simpson ........................ 320/113 |
| 5,841,424 | A | * | 11/1998 | Kikinis .......................... 345/168 |
| 6,204,632 | B1 | | 3/2001 | Nierescher et al. |
| 6,220,880 | B1 | | 4/2001 | Lee et al. |
| 6,937,461 | B1 | | 8/2005 | Donahue, IV |
| 7,061,757 | B2 | * | 6/2006 | Kuo et al. ................. 361/679.45 |
| 7,580,255 | B2 | * | 8/2009 | Crooijmans et al. ...... 361/679.56 |
| 2002/0115480 | A1 | * | 8/2002 | Huang ........................... 455/573 |
| 2007/0217145 | A1 | * | 9/2007 | Sung ............................. 361/686 |

FOREIGN PATENT DOCUMENTS

| | | |
|---|---|---|
| DE | 201 09 106 U1 | 1/2002 |
| EP | 0 485 769 A2 | 5/1992 |
| WO | 98/39820 A1 | 9/1998 |

OTHER PUBLICATIONS

European Search Report for EP 10 17 5869, dated Sep. 27, 2010, with European Search Opinion.

* cited by examiner

*Primary Examiner* — Edward Tso
*Assistant Examiner* — Johali Torres Ruiz
(74) *Attorney, Agent, or Firm* — Sughrue Mion, PLLC

(57) ABSTRACT

An adaptor device for charging portable electronic apparatus, the device being comprised of a plurality of connectors to be coupled mechanically and removably to a housing connectable to a power supply, each connector being comprised of a hollow main body featuring a compartment which may house a voltage regulating electronic circuit, equipped with an aperture for access; and a corresponding closing element for the aforementioned aperture, featuring in turn a window and a means for the fixing of a connecting plug for the portable electronic apparatus located in the aforementioned window and communicating with the interior of the compartment of the hollow main body, the connector also featuring electrical connection terminals in order to establish electrical contact between the connecting plug or the electronic circuit, whichever is the case, and the housing, when the connector is duly coupled into said housing.

7 Claims, 3 Drawing Sheets

ADAPTOR DEVICE FOR CHARGING PORTABLE ELECTRONIC APPARATUS

TECHNICAL FIELD OF THE INVENTION

The invention relates to an adaptor device for charging communication and/or recreation-related portable electronic apparatus, such as mobile telephones, music players or electronic notebooks, equipped with a plurality of connectors to be coupled mechanically and removably, via a coupling means, to a housing connectable to at least one power supply.

BACKGROUND OF THE INVENTION

Over the last years the use of portable communication-and recreation-related electronic apparatus, such as mobile telephones, MP3-type music players or electronic notebooks has increased significantly. Said apparatus are usually powered by batteries, which endow them with a certain autonomy, and which must be recharged in order to be able to continue to supplying the apparatus with power in subsequent uses.

In order to carry out the recharging operation, voltage transformers are usually used; these are usually distributed together with each portable electronic apparatus as an accessory device, these being adapted to be plugged into a power supply, for example by means of twin-pole plug terminals for female wall sockets or by means of cigar-lighter plugs for the female cigar-lighter socket of vehicles, and into the battery of the apparatus in question, usually via the portable electronic apparatus itself, with no need to remove said battery from the interior of the same. This last connection is carried out by means of a plug which usually has a particular shape in accordance with the type of apparatus and which depends on its manufacturer.

Furthermore, in the field of portable electronic apparatus it is frequent for new products or new versions of the product to appear; these require a different plug for connection to the voltage transformers. For this reason, in the majority of cases, consumers and users inevitably tend to collect voltage transformers without being able to dispense with any of these, as currently a standard or universal type of connection is not used for recharging the apparatus; not even between those of the same sector or between similar models. For this reason, as has been explained above, there exists the need to supply, together with the apparatus, the corresponding voltage transformer in order to carry out the recharging operation.

With the aim of solving the aforementioned problems, voltage transformer devices equipped with a plurality of connectors have been revealed, these being mechanically and removably connected by means of a coupling means to said voltage transformer, each of these being equipped with a plug of a particular shape. Said devices are usually very simple, in order to reduce their final price, as is the case with conventional voltage transformers, and also in order to avoid a considerable increase in their weight or size in comparison with the conventional voltage transformers described above. Likewise, the coupling systems of the connectors to the transformer devices are also usually very simple. For this reason, at the moment of coupling the components in order to recharge a portable electronic apparatus, the ergonomic or practical aspects are not taken into account, such as the upright positioning of the electronic apparatus for its use during recharging, or the avoidance of accidental uncoupling between the components of the voltage transformers.

Another problem regarding transformer devices with connectors that can be coupled, as described above, lies in the need to manufacture new connectors equipped with new plugs as new connecting plugs appear on the market; this happens most frequently. The manufacture of said plugs is usually by means of moulding or by plastic injection, with a minimum number of parts in order to reduce costs, these being especially designed so as to hold a particular shape of plug. As a result, whenever a new plug is developed and the new connector is to be manufactured, the manufacturing moulds have to be redesigned.

For this reason, the absence of a more versatile device for the charging of portable electronic apparatus becomes apparent; a device which would be easily adaptable to different connection plug configurations and with the lowest possible cost.

EXPLANATION OF THE INVENTION

The adaptor device which is the object of the invention is intended in particular for the charging of communication and/or recreation-related portable electronic apparatus, such as mobile telephones, music players or electronic notebooks, and is of the type which features a plurality of connectors which can be coupled mechanically and removably by means of a coupling means, to a housing which is connectable to at least one power supply.

Essentially, the adaptor device which is the object of this invention is characterised in that each connector features a hollow main body equipped with a compartment which may house a voltage-regulating electronic circuit, featuring at least one port or aperture for access, and a corresponding element for the closing of said port, featuring in turn a window and a means for holding a connecting plug for the portable electronic apparatus, located in said window and communicating with the interior of the compartment of the hollow main body; the connector also featuring electrical connection terminals in order to establish electrical contact between the connection plug or the electronic circuit, whichever is the case, and the housing when the connector is duly coupled to said housing. Thanks to the hollow compartment of the main body of the connectors, each connector may be adapted to a different plug configuration simply by changing the closing element and possibly by adding or removing an electronic device from its interior, it not being necessary to change the remainder of the elements of the connector, instead of having to manufacture a completely new connector, in order to charge different portable electronic apparatus with the same charging device.

In accordance with another characteristic of the invention, the coupling means are comprised, in the main body of each connector, of a pair of lateral grooves, and in the housing, corresponding pairs of elastically bendable tabs whose free ends feature respective protrusions shaped in such a way as to be lodged, due to the elastic reaction of the tabs on insertion of the connector between two tabs forming a pair, into a respective groove of the main body of the connector, the separation of the connector from the housing being prevented by the protrusions buttressing against the profile of the grooves.

In accordance with another characteristic of the invention, the housing is comprised of a plurality of cavities, featuring their corresponding apertures, each of which is intended to receive a connector for the coupling of the same to the housing. Due to the fact that the housing features more than one cavity, the adaptor device permits the simultaneous charging of more than one portable electronic device with a single charging device. In addition, the profile of said apertures is sized in such a way that it is greater than that of the connectors, and the protrusions are adapted so as to slide along the grooves, thus endowing the connector with a certain amount of movability in the interior of the cavities. Thanks to this movability, the ergonomics of the adaptor device is improved.

Another aspect to be highlighted regarding the adaptor device which is the object of this invention is that each connector features in the area of its aperture a projecting external flange, and because each cavity of the housing features at its opening a supporting frame for the aforementioned projecting external flange of the corresponding connector, whose supporting surface is convexly curved, the external flange of the connector being adapted so as to slide over the convexly curved surface of the supporting frame while remaining attached to the housing.

The adaptor device in accordance with the invention is further characterised in that the external flange of the main body of the connectors features a lower surface which is also convexly curved, in correspondence with the supporting surface of the supporting frame of the cavities of the housing.

Another characteristic of the adaptor device of this invention consists of the fact that the supporting frames are coupled in the respective apertures of the cavities of the housing and at the bottom of the same they feature two pins directed towards the bottom of the cavities, sized so that their ends are adjacent to the respective tabs of the coupling means; thus, when the pins are moved in the direction of the tabs, the former may press against the latter until the protrusions are dislodged from the grooves into which they are inserted, and in this way the connector may be removed from the housing.

In accordance with another characteristic of the invention, the electrical terminals of the connectors are comprised of two spring strips of electrically conducting material which are compressed, in contact with respective electrical terminals arranged within the housing, when a connector is coupled into a corresponding cavity of the housing.

The adaptor device is further characterised in that the spring strips of conductive material comprise a first joining end section with the main body of the connector, intended to make contact with a corresponding electrical terminal of a plug, and a second end section, curved, in electrical contact with the housing, joined by a central stretch, bent in accordance with a triple fold over three parallel transversal fold lines, forming a kink of 180°, all of this without interruption in the spring strip.

BRIEF DESCRIPTION OF THE DRAWINGS

The attached drawings portray, as a non-limitative example, a preferred embodiment of the adaptor device which is the object of this invention. In said drawings.

DETAILED DESCRIPTION OF THE DRAWINGS

Figure 1:
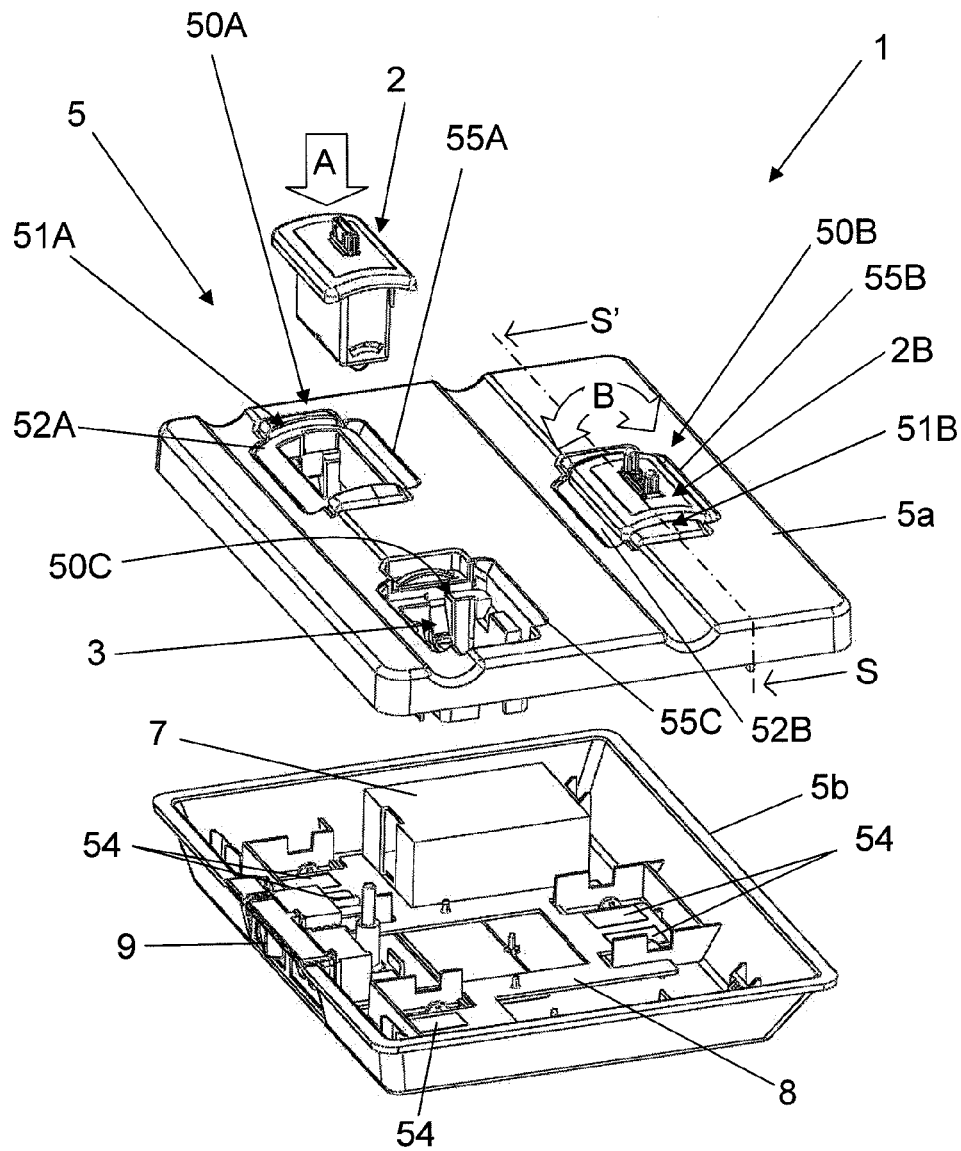
FIG. 1 is a view in perspective of an adaptor device with its housing divided into two halves and with two connectors, one of which is duly coupled to the housing while the other is arranged in a position prior to coupling.

FIG. 1 portrays a preferred variant of an adaptor device 1 for charging portable electronic apparatus, comprised of a housing 5, connectable to a power supply source such as the conventional electrical grid, adapted to receive by removable coupling three connectors 2 by means of respective coupling means 3, as shall be disclosed below.

In FIG. 1 the housing 5 of the adaptor device 1 has been portrayed in two separate parts, an upper part 5A and a lower part 5B, in order to show the interior of the same with greater clarity. When the two said parts 5A and 5B are joined together, they form three cavities 50A, 50B and 50C, in staggered formation, whose apertures 55A, 55B and 55C respectively are made in the upper part 5A. The cavity 50A features a supporting frame 51A assembled at the aperture 55A and comprises a connector 2 prepared to be coupled by means of an operation represented by the arrow A. The cavity 50B features a supporting frame 51B and the connector 2B; both of these coupled in the aperture 55B. Finally, aperture 50C has been portrayed empty in order to offer a partial view of the coupling means 3 arranged in its interior. The housing 5 also features a switch 9 in order to connect and disconnect the electrical current supplied to the device 1.

In the interior of the housing 5, and on its lower part 5b in accordance with FIG. 1, a voltage transformer 7 is located, and also a base plate 8 which acts as a support for the electronic circuit which distributes the electrical current through the device 1 and which features electrical terminals 54.

Figure 2:
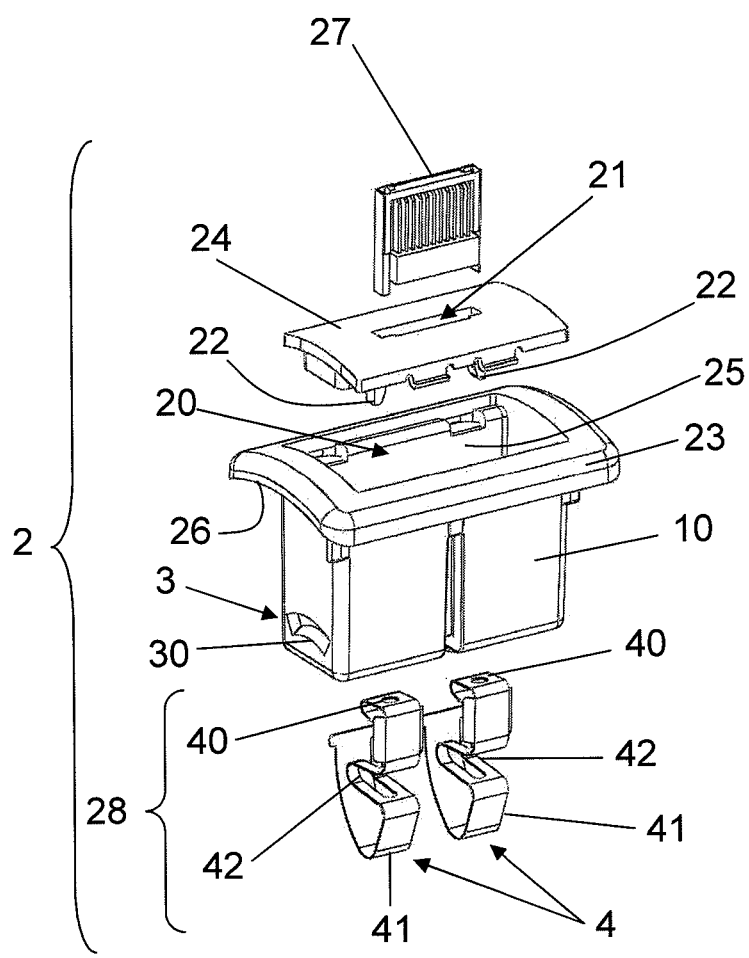
FIG. 2 is also a perspective exploded view of a connector in accordance with the adaptor device which is the object of the invention.

FIG. 2 portrays in detail one of the connectors 2 portrayed in FIG. 1. Said connector 2 is comprised of an essentially parallel-epipedic main body 10 which features a hollow compartment 25 in its interior, into which a voltage-regulating electronic circuit (not portrayed) may be lodged, whose upper surface features an access aperture 20 and a corresponding closing element 24 of the aforementioned aperture 20, by way of a cover. The closing element 24 in turn features a window 21 and a fixing means 22 by the clipping (see FIG. 3) of a connection plug 27 for a portable electronic apparatus (not portrayed) intended to be charged by the adaptor device 1. The position and the shape of the aforementioned window 21 allows access to the interior of the compartment 25 of a part of the plug 27, in such a way that on assembling completely the connector 2, the plug 27 establishes electrical contact with some electrical connection terminals 28 also arranged in the interior of the main body 10 of the connector 2. Should it be desired to manufacture another connector 2 with a plug 27 of a different shape from that portrayed, the window 21 and the fixing means 22 of the closing element 24 would be redesigned so as to adapt to said shape, the remainder of the connector remaining identical.

The electrical connection terminals 28 of the connector 2 are comprised of two strips 4 of electrical conductive material, which are capable of being compressed on receiving pressure in a longitudinal direction. Said flexibility is provided by the elastic characteristics of the material of which they are made and by their particular shape. Each spring strip 4 features a first end section 40 joining the main body 10 of the connector 2, intended to make contact with a corresponding electrical terminal of a plug 27, and a second end section 41, curved, to make electrical contact with the housing 5 (see FIG. 3), joined by a central section 42, bent with a triple fold along three parallel transversal fold lines, forming a kink of 180°, all of this without interruption in the spring strip; all of this endows the spring strip 4 with greater elasticity in a longitudinal direction without causing great changes in the dimensions of the same.

Figure 3:
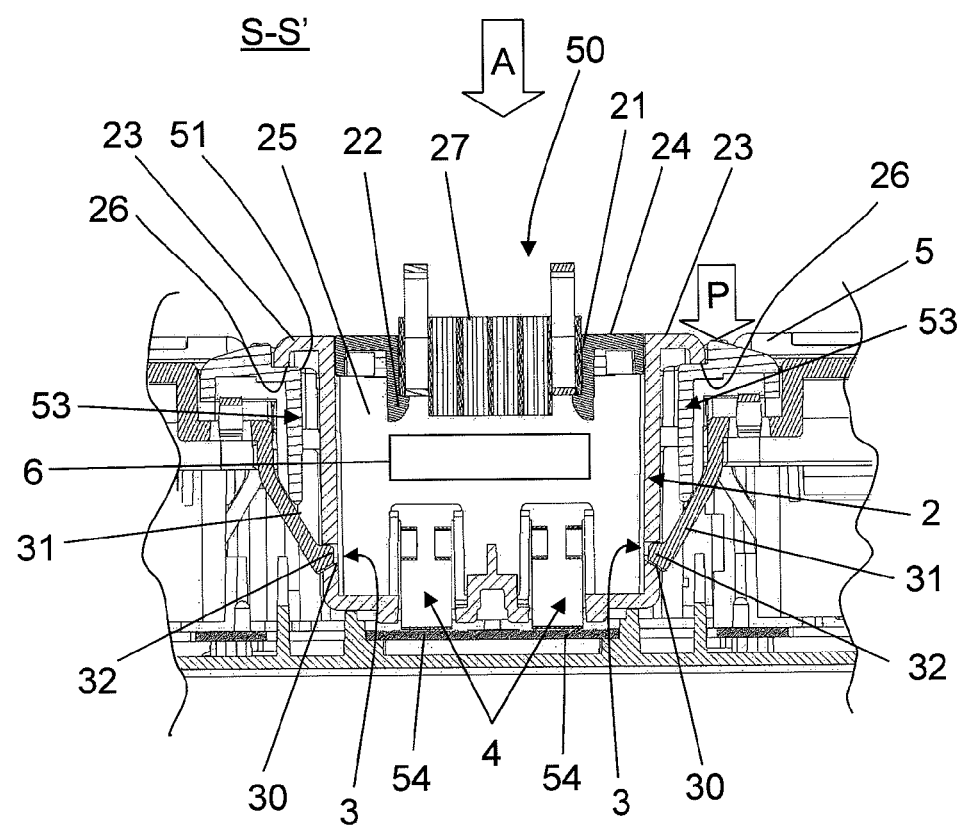
FIG. 3 is a frontal schematic view along the cross-section S-S' portrayed in FIG. 1 of part of the adaptor device, specifically of the coupling means between a connector such as that of FIG. 2 and the housing of the adaptor device.

FIG. 3 portrays the connector 2 totally assembled and coupled by the coupling means 3 to a cavity 50 featured by the housing 5, the spring strips 4 being compressed in contact with respective electrical terminals 54 arranged within said housing 5. The coupling means 3 are comprised, in the main body 10 of the connector 2, of a pair of lateral grooves 30 (see also FIG. 2) and, in the cavity 50 of the housing 5, corresponding elastically bendable tabs 31 whose free ends feature respective protrusions 32. These protrusions 32 are shaped so as to latch, by means of the elastic reaction of the tabs 31, when the connector is inserted into the cavity 50 in the direction indicated by the Arrow A of FIG. 3, into a respective groove 30 of the main body 10 of the connector 2. In this way, in the position portrayed, the removal of the connector 2 from the cavity 50 is prevented, as the protrusions 32 buttress against the profile of the grooves 30.

Additionally, as may be seen in FIG. 2, the grooves 30 of the main body 10 of the connector 2 feature a curved shape, while the protrusions 32 are adapted so that, once inserted into the grooves 30, they may move along said grooves 30. On the other hand, the main body 10 of the connector 2 features, in the region of its aperture 20, a projecting external flange 23, the lower surface 26 of said external flange 23 being convexly curved. In turn, the cavity 50 of the housing 5, whose aperture 55 comprises a profile slightly larger than that of the main body 10 of the connector 2, features at its opening a supporting frame 51 for the aforementioned external flange 23 of the corresponding connector 2, whose supporting surface 52 is also convexly curved, preferably corresponding to the curvature of the external flange 23, said external flange 23 of the connector 2 being adapted so as to slide over the convexly curved surface 52 of the supporting frame 51 when the connector 2 is duly coupled to the housing 5. Thus, the connector 2 is endowed with a certain mobility in the interior of the cavity 50. Specifically, the movement of the connector 2 when coupled into the housing 5 consists of a rocking movement whose virtual axis passes through the points of contact of the curved section 41 of the spring strips 4 with the respective electrical terminals 54. This movement gives the connector 2 a certain degree of freedom when coupled into the housing 5, endowing the adaptor device 1 with better ergonomics. Said rocking movement of the connector 2B with regard to the housing 5 is portrayed in FIG. 1 by means of the arrow B.

Evidently, the profile of the aperture 55 may be different from that of this embodiment. For example, the possibility may be considered that it may coincide with the profile of the connector 2, in such a way that on coupling the connector into the cavity 50, the former will fit adjustedly into the latter, the profile of the aperture 55 itself carrying out the function of the coupling means 3.

In FIG. 3 it may also be seen how the spring strips 4 of the electrical connection terminals 28, when compressed, make electrical contact with the electrical terminals 54. As has been mentioned above, for the correct charging of the corresponding portable electronic device, the connector 2 may house a voltage regulating electronic circuit 6 in the cases where it may be necessary to regulate the electrical current supplied via said spring strips 4 of the terminals 28, portrayed schematically in FIG. 3 by means of a blank rectangle. Evidently, in the event that said electronic circuit 6 should not be required and that the current supplied via the spring strips 4 of the terminals 28 should be suitable for the charging operation, the plug 27 would be connected directly via the necessary conductive elements to the terminals 28. The possibility that the aforementioned compartment 25 of the connector 2 may house a power supply source is included in the scope of this invention.

In the same FIG. 3, it may be seen that the supporting frame 51 is coupled into the aperture 55 of the cavity 50 of the housing 5 and that it features inferiorly two pins 53, directed towards the bottom of the cavity 50. Said pins 53 are sized so that their ends are adjacent to the respective tabs 31 of the coupling means 3. In this way, when the pins 53 are displaced in the direction of the tabs 31, for example when exerting pressure on the supporting frame 51 in the direction indicated by the Arrow P, the former exert pressure against the latter until the protrusions 32 are dislodged from the grooves 30 into which they are inserted, in such a way that the connector 2 is uncoupled from the housing 5 and tends automatically to partially exit the cavity 50 due to the elastic action of the spring strips 4 of the electrical terminals 28 which press the main body 10 of the connector 2 in an upward direction.

Optionally, the grooves 30 may feature a sloping wall at their longitudinal ends, by way of a ramp, allowing the protrusions 32 to exit the grooves 30 when the connector 2 is thus obliged.

Evidently, adaptor devices 1 of the type disclosed with a number of cavities 50 in the housing 5 which is different from that portrayed in the embodiment are also included within the scope of this invention. Additionally, other possibilities different from that disclosed are also contemplated; for example that the device should feature the voltage transformer 7 outside the housing 5, that it should feature a voltage transformer 7 for each cavity 50 arranged in the interior of the housing 5 or in the interior of the hollow compartments 25 of the connectors 2.

The invention claimed is:

1. An adaptor device for the charging of communication and/or recreation-related portable electronic apparatuses, the device comprising a plurality of connectors to be coupled mechanically and removably, via a coupling means, to a housing connectable to at least one power supply, wherein each connector is comprised of a hollow main body comprising a compartment configurable to house a voltage regulating electronic circuit, equipped with at least one access port or aperture and a corresponding closing element for the aperture, comprising in turn a window and a fixing means for a connecting plug for the portable electronic apparatus located in the window and communicating with the interior of the compartment of the hollow main body, the connector also comprising electrical connection terminals in order to establish electrical contact between the connecting plug or the electronic circuit, whichever is the case, and the housing, when the connector is duly coupled into said housing;

wherein the coupling means comprises in the main body of each connector a pair of lateral grooves and, in the housing, corresponding pairs of elastically bendable tabs comprising at free ends of the tabs respective protrusions shaped so as to lodge, through elastic reaction of the tabs, on insertion of the connector between two tabs of the same pair, into a respective groove of the main body of the connector, the separation of the connector from the housing prevented by the protrusions buttressing against the profile of the grooves; and wherein the housing comprises a plurality of cavities, comprising corresponding apertures, each of which is configured to receive a connector for coupling to the housing, the profile of said apertures sized to be greater than that of the connectors, and the protrusions are adapted so as to slide along the grooves, endowing the connector with a certain amount of mobility in the interior of the cavities.

2. An adaptor device as claimed in claim 1, wherein the main body of each connector comprises in a region of the respective aperture a projecting external flange, and each cavity of the housing comprises at an opening of the cavity a supporting frame for the external flange of the corresponding connector, whose supporting surface is convexly curved, the external flange of the connector adapted so as to slide over the convexly curved surface of the supporting frame while remaining attached to the housing.

3. An adaptor device as claimed in claim 2, wherein the supporting frames are coupled into the respective apertures of the cavities of the housing and comprise two pins directed towards the bottom of the cavities, sized in such a way that ends of the pins are adjacent to respective tabs of the coupling means, in such a way that when the pins are moved in the direction of the tabs, the former may press against the latter until the protrusions are dislodged from the grooves into which they are inserted, in order that the connector may be extracted from the housing.

4. An adaptor device as claimed in claim 1, wherein the external flange of the main body of the connectors is comprised of an inferior surface which is also convexly curved in order to correspond with the supporting surface of the supporting frame of the cavities of the housing.

5. An adaptor device as claimed in claim 1, wherein the electrical terminals of the connectors are comprised of two spring strips of electrically conductive material, which are compressed, in contact with the respective electrical terminals arranged within the housing when a connector is coupled into a corresponding cavity of the housing.

6. An adaptor device as claimed in claim 5, wherein the spring strips of conductive material comprise a first end section joining the main body of the connector, configured to make contact with a corresponding electrical terminal of a plug, and a second, curved end section, configured to make electrical contact with the housing, joined by a central section, bent with a triple fold along three parallel transversal fold lines, forming a kink of 180°, all of this without interruption in the spring strip.

7. The adaptor device as claimed in claim 1, wherein the electronic apparatus is a mobile telephone, music player or electronic notebook.

* * * * *